US010931975B2

(12) United States Patent
Turmel et al.

(10) Patent No.: US 10,931,975 B2
(45) Date of Patent: *Feb. 23, 2021

(54) TECHNIQUES FOR DETECTING MEDIA PLAYBACK ERRORS

(71) Applicant: NETFLIX, Inc., Los Gatos, CA (US)

(72) Inventors: Frederic Turmel, Sunnyvale, CA (US); Nicholas Newell, Pacifica, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/422,903

(22) Filed: May 24, 2019

(65) Prior Publication Data
US 2019/0281324 A1 Sep. 12, 2019

Related U.S. Application Data

(63) Continuation of application No. 15/633,661, filed on Jun. 26, 2017, now Pat. No. 10,306,270.

(51) Int. Cl.
H04N 19/89 (2014.01)
H04L 29/06 (2006.01)
H04L 12/26 (2006.01)
H04L 12/24 (2006.01)
H04N 17/00 (2006.01)
H04N 17/04 (2006.01)

(52) U.S. Cl.
CPC .......... *H04N 19/89* (2014.11); *H04L 41/147* (2013.01); *H04L 43/022* (2013.01); *H04L 43/0847* (2013.01); *H04L 65/80* (2013.01); *H04N 17/004* (2013.01); *H04N 17/04* (2013.01)

(58) Field of Classification Search
CPC ....... H04N 19/89; H04L 41/17; H04L 43/022; H04L 43/04847; H04L 65/80
USPC ..................................................... 375/240.27
See application file for complete search history.

(56) References Cited

U.S. PATENT DOCUMENTS 5,784,527 A    7/1998  Ort
2014/0053214 A1    2/2014  Walker et al.
2014/0267780 A1    9/2014  Spears et al.

FOREIGN PATENT DOCUMENTS

WO    2009/042367 A1    4/2009

OTHER PUBLICATIONS

Kyungchul et al., "A video test pattern generator for evaluating 4K UHD video monitors", 2015 IEEE 5th International Conference on Consumer Electronics—Berlin (ICCE—Berlin), IEEE, Sep. 6, 2015, pp. 267-270.

*Primary Examiner* — Nguyen T Truong
(74) *Attorney, Agent, or Firm* — Artegis Law Group, LLP

(57) ABSTRACT

An endpoint device outputs frames of test media during a testing procedure. Each frame of test media includes a test pattern. A test module coupled to the endpoint device samples the test pattern and transmits sample data to a media test engine. The media test engine decodes a binary number from the test pattern and then converts the binary number to an integer value that is associated with the corresponding frame. The media test engine then analyzes sequences of these integer values to identify playback errors associated with the endpoint device.

24 Claims, 11 Drawing Sheets

JUDDER / STUTTER DETECTION

- WITH NO STUTTER, TIMESTAMP SHOULD INCREASE BY $F_{int}$

- WHEN STUTTER OR JUDDER IS PRESENT, FRAME INTERVAL IS NOT CONSTANT FOR MULTIPLE CONSECUTIVE FRAMES

- FRAMES HAVE INCONSISTENT INTERVALS $t_1 - t_0 = F_{int}$
$t_2 - t_1 = F_{int} \times 0.5$
$t_3 - t_2 = F_{int} \times 1.5$
$t_4 - t_3 = F_{int} \times 0.8$
$t_5 - t_6 = F_{int} \times 1.2$

EACH FRAME INTERVAL IS NOT CONSTANT

COUNTER ROLL OVER

- COUNTER SHOULD RESET TO ZERO AT PREDICTED TIMESTAMP BASED ON NUMBER OF COUNTER BITS
- 2-BIT COUNTER SHOULD RESET AFTER FRAME 3
- COUNTER DOES NOT RESET TO ZERO AT $t_3$

TECHNIQUES FOR DETECTING MEDIA PLAYBACK ERRORS

CROSS-REFERENCE TO RELATED APPLICATIONS

This application is a continuation of the co-pending U.S. patent application titled, "TECHNIQUES FOR DETECTING MEDIA PLAYBACK ERRORS," filed on Jun. 26, 2017 and having Ser. No. 15/633,661. The subject matter of this related application is hereby incorporated herein by reference.

BACKGROUND OF THE INVENTION

Field of the Invention

Embodiments of the present invention relate generally to media playback and, more specifically, to techniques for detecting media playback errors.

Description of the Related Art

Many original equipment manufacturers (OEMs) produce endpoint devices that are pre-configured to connect to a video streaming service via an application that executes on the endpoint device. For example, an OEM could produce a smart television set that is pre-loaded with an endpoint application that can be automatically executed by the smart television to connect to the video streaming service and stream media titles to the smart television. With this approach, end-users may view media titles without needing to install additional software on the endpoint devices they purchase.

An endpoint application that is pre-loaded on a given endpoint device may stream and playback many different versions of a given media title. In so doing, the endpoint application selects a particular version of the media title for playback depending on various factors, such as the connection parameters with which the endpoint application connects to the video streaming service. For example, if the endpoint application were to connect to the video streaming service with low available bandwidth, the endpoint application would select a low-bitrate version of the given media title. In addition, the endpoint application may select a particular version of the given media title based on the hardware and/or software capabilities associated with the endpoint device. For example, the endpoint application would select an appropriately encoded version of the media title based on the hardware and/or software decoding capabilities of the endpoint device.

Prior to distributing a given model of endpoint device, an OEM typically performs a comprehensive testing procedure that involves playing back different versions of media titles on test endpoint devices having different configurations. For example, an OEM could setup a testing procedure that involves testing a version of a media title having a particular resolution on a test endpoint device that runs a specific release of the endpoint application. While testing the different test endpoint devices, human test engineers observe the playback of the different versions of media titles on the different test endpoint devices to identify and log playback errors. For example, a human test engineer could observe that a given test endpoint device fails to play a particular frame of a given media title version. This particular error is known in the art as a "frame drop" error. Alternatively, the human test engineer could observe that the endpoint device plays back a particular frame more than once. This error is known in the art as a "freeze frame" error.

As noted above, an OEM sets up testing procedures for a given endpoint device to test many different versions of available media titles with many different configurations of the endpoint device. In this manner, the OEM attempts to identify as many playback errors as possible in order to avoid exposing end-users to those errors. However, this approach suffers from at least three drawbacks.

First, OEMs typically cannot test all possible versions of each available media title with every different model of endpoint device and all different versions of the endpoint application because the number of possible test combinations is oftentimes too large. To solve this problem, OEMs usually test only a handful of versions of a limited subset of media titles with only the most recent release of the endpoint application. However, such limiting test coverage can expose end-users to playback errors associated with untested use cases. Test coverage may further be limited due to encryption protection associated with certain endpoint devices.

Second, different OEMs may not implement the exact same testing procedures, leading to inconsistent test results across different OEMs. For example, different OEMs may implement different test procedures altogether or may implement the same test procedure differently. If the test results are inconsistent across different OEMs, then different OEMs are likely to correct different sets of playback errors. As a result, endpoint devices from different OEMs may provide user experiences of variable quality when streaming video from the video streaming service, which may reflect poorly on the video streaming service.

Third, human test engineers do not always perceive every playback error that arises during testing. Thus, to the extent an actual end-user viewing experience reflects a given test scenario, the user could be exposed to any playback errors missed by the human test engineer during that test scenario. Additionally, human perception is generally subjective, reducing consistency across human test engineers.

As the foregoing illustrates, what is needed in the art is an improved approach to detecting streaming video playback errors when testing endpoint devices.

SUMMARY OF THE INVENTION

One embodiment of the present invention sets forth a computer-implemented method, including sampling a test module coupled to a display of an endpoint device to generate a set of data streams, where the endpoint device outputs sequential frames of video data on the display, processing the set of data streams to generate a sequence of data points, wherein each data point in the sequence of data points corresponds to a different frame of the video data, determining that the sequence of data points has diverged from a predicted sequence of data points, and analyzing at least one divergence from the predicted sequence of data points to identify a first error associated with the sequential frames of video data output on the display.

At least one advantage of the techniques described herein is that automating testing of endpoint devices in the manner described greatly expands the test coverage feasible for OEMs of those endpoint devices.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

As discussed above, conventional testing procedures for endpoint devices provide only limited test coverage across the many combinations of endpoint device hardware, endpoint device software, and media title version offered by a video streaming service. Further, conventional testing procedures are inconsistent between different equipment manufacturers and unreliable across different human test engineers. These issues may expose the user of the video streaming service to an increased amount of playback errors, which may reflect poorly on the video streaming service.

To address these specific problems, embodiments of the present invention include various techniques to automate the testing and quality control of consumer endpoint devices that interface with the video streaming service. In particular, during testing, a test computer is coupled to an endpoint device via a test module. The endpoint device plays back a media title that has been watermarked with different test patterns. The test module samples the test patterns and transmits sample data to the test computer. The test computer is able to identify a range of different types of playback errors by analyzing the sample data.

Automating the testing procedure in this manner allows greater test coverage because many more combinations of hardware, software, and media title version can be tested. Furthermore, the testing procedure is more easily replicated across different equipment manufacturers. Finally, reducing the involvement of human test engineers increases the reliability of the testing procedure. With these various improvements, the user of the video streaming service may be exposed to fewer playback errors, thereby improving user experience and promoting further engagement with the video streaming service.

System Overview

Figure 1:
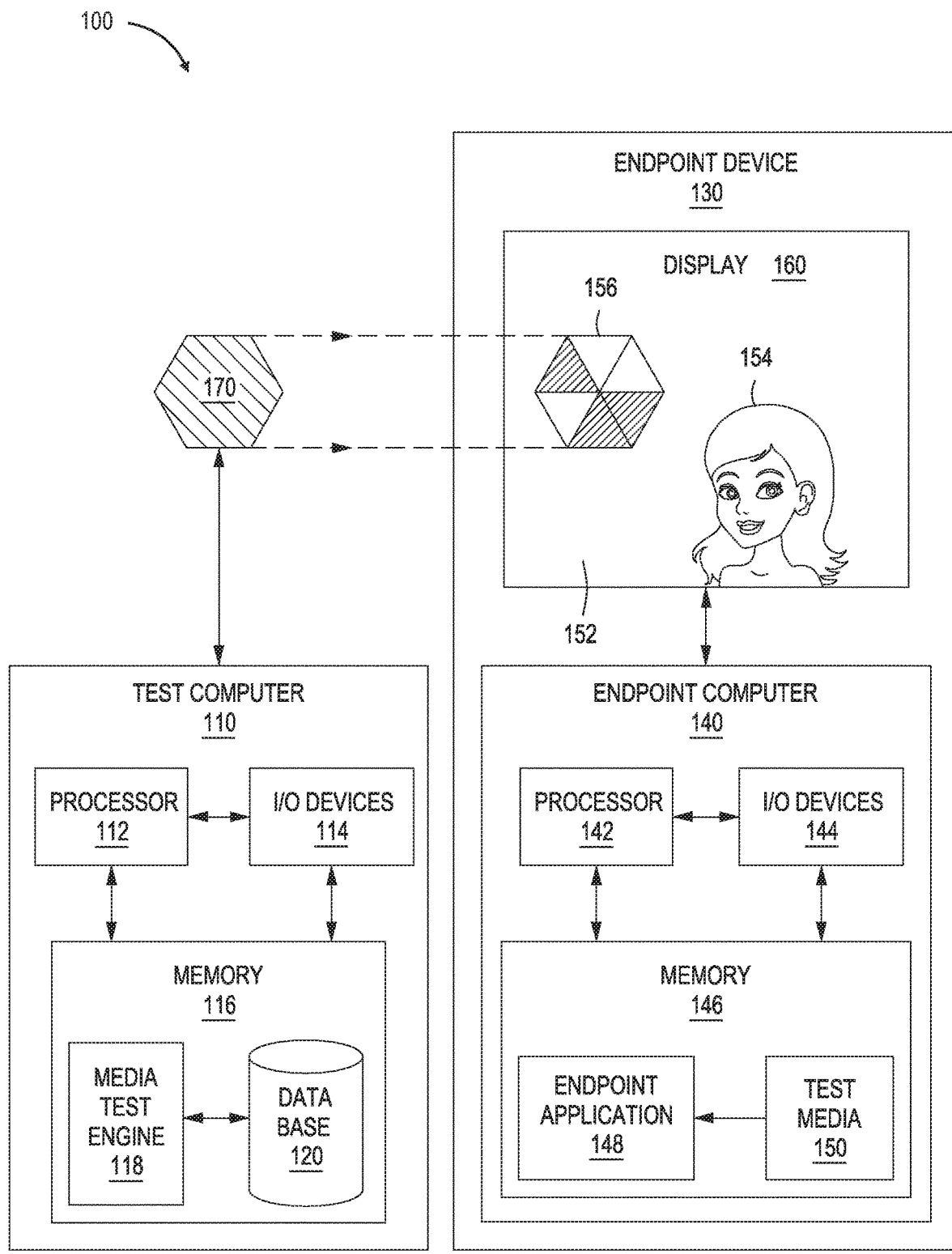
FIG. 1 illustrates a system configured to implement one or more aspects of the present invention.

FIG. 1 illustrates a system configured to implement one or more aspects of the present invention. As shown, a system 100 includes a test computer 110 coupled to an endpoint device 130 via a test module 170. Test computer 110 is configured to test endpoint device 130 for quality assurance purposes using test module 170.

Test computer 110 includes a processor 112, input/output (I/O) devices 114, and a memory 116 coupled together. Processor 112 may be any technically feasible form of processing device configured to process data and execute program code. Processor 112 could be, for example, a central processing unit (CPU), a graphics processing unit (GPU), an application-specific integrated circuit (ASIC), a field-programmable gate array (FPGA), any technically feasible combination of such units, and so forth.

I/O devices 114 may include devices configured to receive input, including, for example, a keyboard, a mouse, and so forth. I/O devices 114 may also include devices configured to provide output, including, for example, a display device, a speaker, and so forth. I/O devices 114 may further include devices configured to both receive and provide input and output, respectively, including, for example, a touchscreen, a universal serial bus (USB) port, and so forth.

Memory 116 may include any technically feasible storage medium configured to store data and software applications. Memory 116 could be, for example, a hard disk, a random access memory (RAM) module, a read-only memory (ROM), and so forth. Memory 116 includes a media test engine (MTE) 118 and a database 120. MTE 118 is a software application that, when executed by processor 112, samples data from test module 170 during test procedures. Database 120 is configured to store test data gathered by MTE 118.

Endpoint device 130 is a consumer device configured to execute software applications and display video content to end-users. For example, endpoint device 130 could be a smart TV, a mobile phone, a handheld gaming device, a laptop computer, a tablet computer, and so forth. Endpoint device 130 includes an endpoint computer 140 and a display 160.

Endpoint computer 140 includes a processor 142, I/O devices 144, and a memory 146, coupled together. Processor 142 may be any technically feasible form of processing device configured to process data and execute program code, including a CPU, a GPU, an ASIC, an FPGA, any technically feasible combination of such units, and so forth. I/O devices 144 may include devices configured to receive input, produce output, or both, similar to I/O devices 114 discussed above. Memory 146 is a storage medium configured to store data and software applications, including endpoint application 148 and test media 150.

Endpoint application 148 is a software application that, when executed by processor 142, is configured to connect to a video streaming service in order to stream media titles to endpoint computer 140. Endpoint application 148 may buffer streamed media titles for playback to end-users via display 160. Endpoint application 148 is also configured to playback test media 150 on display 160 during the testing procedures mentioned above. For example, display 160 could display a frame 152 of test media 150, as is shown.

Frame 152 includes video content 154 and a test pattern 156. Test module 170 is configured to sample test pattern 156 and transmit sample data to MTE 118. Prior to testing, a preprocessing engine (not shown) superimposes a separate test pattern 156 onto each frame of test media 150. Thus, each frame of test media 150 includes a test pattern 156. During testing, endpoint application 148 causes display 160 to output frames of test media 150. Test module 170 samples each test pattern 156 superimposed onto those frames and transmits sample data to MTE 118 for each such frame. MTE 118 processes the sample data to detect playback errors associated with endpoint device 130 and/or test media 150, as described in greater detail below in conjunction with FIGS. 2A-6.

Endpoint Device Testing Overview

Figure 2A:
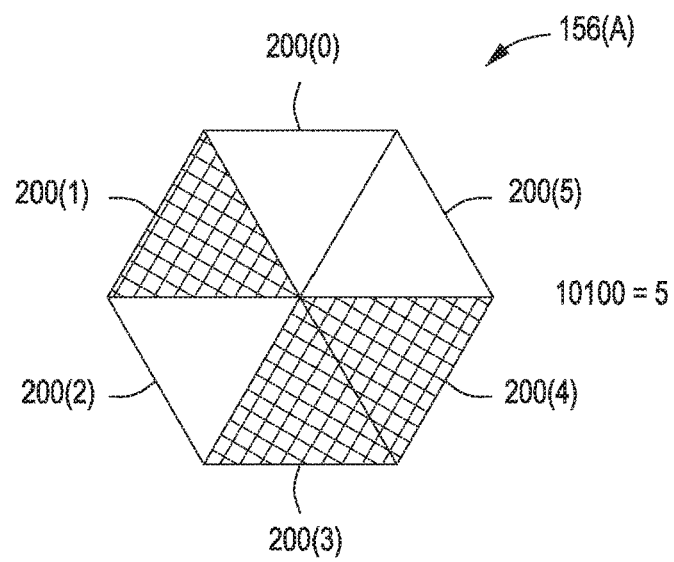
FIGS. 2A-2C illustrate exemplary test patterns that encode different binary numbers, according to various embodiments of the present invention.
Figure 2B:
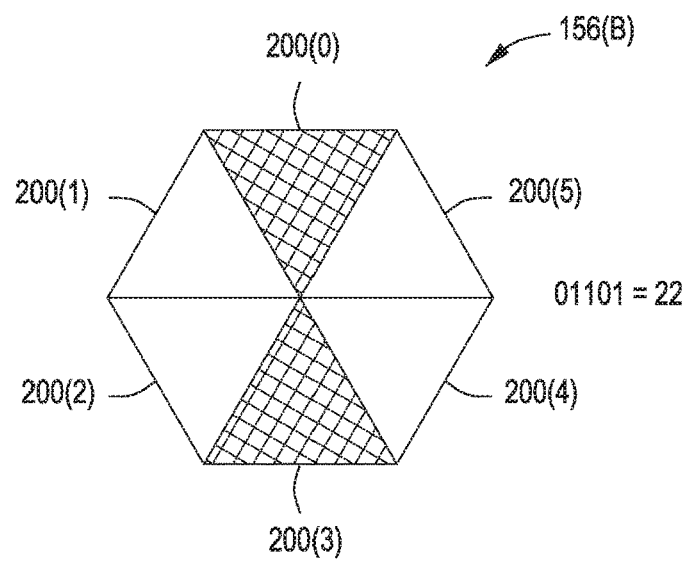
Figure 2C:
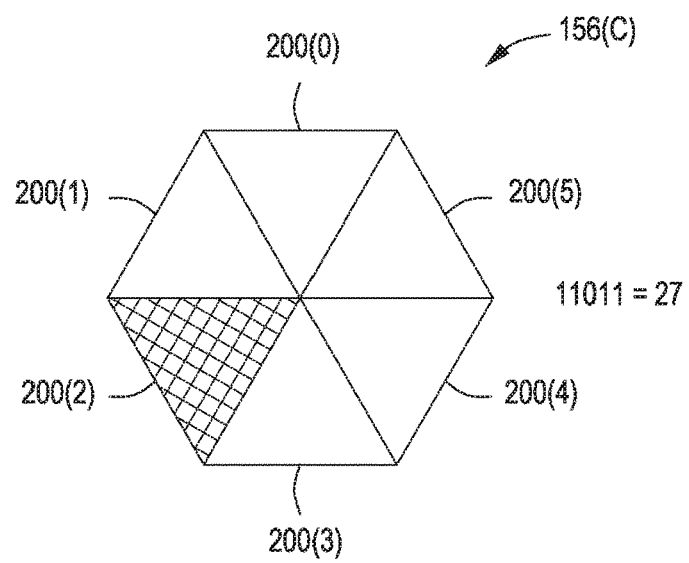

FIGS. 2A-2C illustrate exemplary test patterns that encode different binary numbers, according to various embodiments of the present invention. As shown in FIGS. 2A-2C, test pattern 156 is a radially symmetric shape divided into different regions 200. In practice, test pattern 156 includes six regions, shown in FIGS. 2A-2C as 200(0) through 200(5). However, test pattern 156 may include any number of regions. Region 200(5) is used for calibration and control and is discussed in greater detail below in conjunction with FIG. 4. For any given frame of test media 150, regions 200(0) through 200(4) of the superimposed test pattern 156 can be light or dark. In the context of this disclosure, "light" generally means white or having a whiteish color, while "dark" means black or having a blackish color.

These light or dark regions 200 represent individual bits. A light region 200 represents a "1," while a dark region 200 represents a "0." In addition, each of regions 200(0) through 200(4) corresponds to a specific binary position. Region 200(0) corresponds to binary position 0, region 200(1) corresponds to binary position 1, region 200(2) corresponds to binary position 2, region 200(3) corresponds to binary position 3, and region 200(4) corresponds to binary position 4. According to these mappings, a given test pattern 156 encodes a specific binary number having five bits, where the bit associated with each binary position is derived from the corresponding light or dark region 200.

As shown in FIG. 2A, exemplary test pattern 156(A) includes light region 200(A), dark region 200(1), light region 200(2), dark region 200(3), and dark region 200(4). This illumination pattern corresponds to a binary number 10100, having integer value of 5.

As shown in FIG. 2B, exemplary test pattern 156(B) dark region 200(A), light region 200(1), light region 200(2), dark region 200(3), and light region 200(4). This illumination pattern corresponds to a binary number 01101, having integer value of 22.

As shown in FIG. 2C, exemplary test pattern 156(C) light region 200(A), light region 200(1), dark region 200(2), light region 200(3), and light region 200(4). This illumination pattern corresponds to a binary number 11011, having integer value of 27.

Referring generally to FIGS. 2A-2C, persons skilled in the art will recognize that any given test pattern 156 may represent, via regions 200(0) through 200(4), any 5-bit binary number having integer value 0-31. In practice, sequential frames of test media 150 encode incrementally increasing binary numbers, up to a maximum value of 11111 or 32. Accordingly, a sequence of test patterns 156 represents different states of a 32-bit counter. When test pattern 156 reaches the maximum value of 31, a subsequent test pattern 156 will "rollover" to a value of 0, similar to a traditional binary counter.

During testing, test module 170 is configured to sample light intensity data associated with the specific test pattern 156 superimposed onto each frame of test media 150 and then transmit this sample data to MTE 118. MTE 118 processes this sample data to decode, based on samplings of regions 200, the binary number associated with each such frame. MTE 118 also detects, based on samplings of region 200(5) specifically, a refresh frequency and backlight intensity associated with display 160. MTE 118 translates the decoded binary numbers into integer values in the range 0-31 and associates these integer values with the corresponding frame.

Under nominal operating conditions, these integer values increase monotonically to 31, return to zero, and begin monotonically increasing to 31 again in a repeating pattern. MTE 118 applies specific error criteria to these integer values in order to detect playback errors. Generally, MTE 118 detects playback errors when the sequence of integer values and/or timestamps associated with those values departs from a predicted pattern. Test module 170 and MTE 118 are discussed in greater detail below in conjunction with FIGS. 3A-3B, respectively.

Figure 3A:
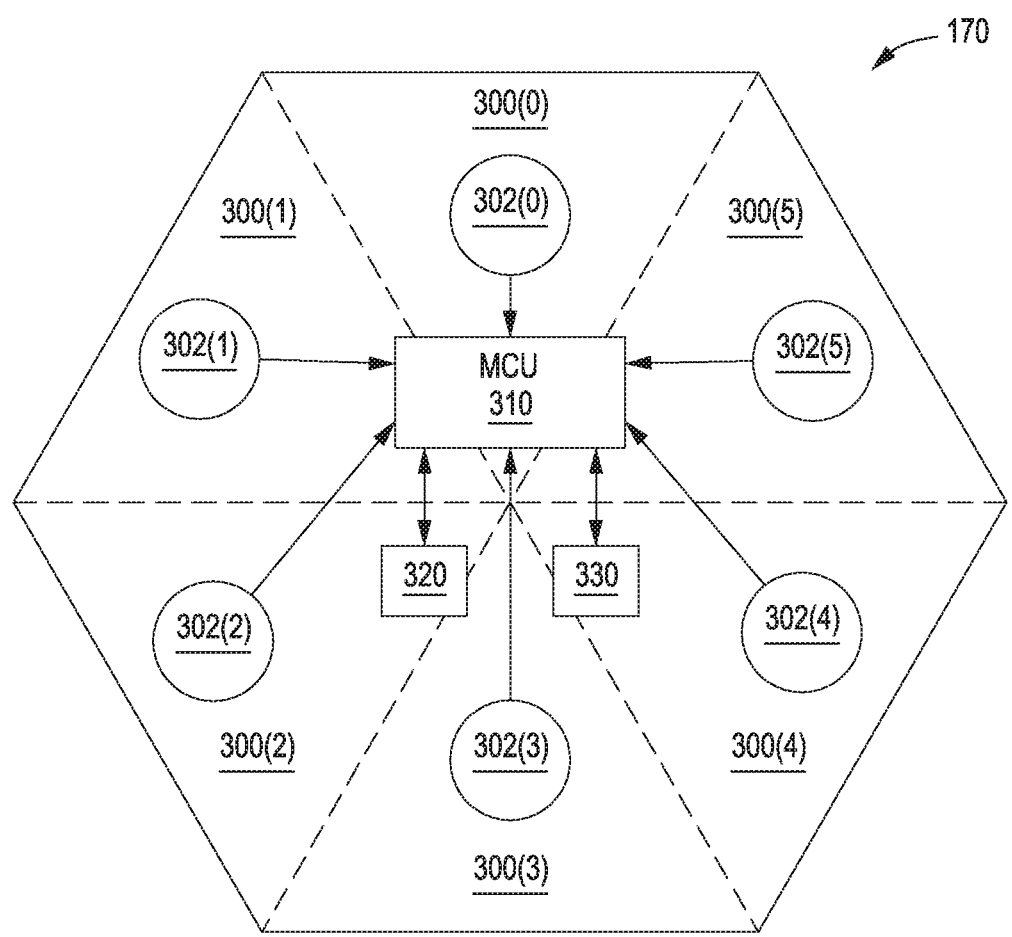
FIG. 3A is a more detailed illustration of the test module of FIG. 1, according to various embodiments of the present invention.

FIG. 3A is a more detailed illustration of the test module of FIG. 1, according to various embodiments of the present invention. As shown, test module 170 is a radially symmetric polygon, like test pattern 156, and includes regions 300(0) through 300(5). Each region 300 includes an optical sensor 302. Region 300(0) includes optical sensor 302(0), region 300(1) includes optical sensor 302(1), region 300(2) includes optical sensor 302(2), region 300(3) includes optical sensor 302(3), region 300(4) includes optical sensor 302(4), and region 300(5) includes optical sensor 302(5). Each optical sensor 302 is coupled to a microcontroller unit (MCU) 310. MCU 310 is coupled to an audio input 320 and to a universal serial bus (USB) port 330.

During testing, test module 170 is physically attached to display 160 at a location where test pattern appears within frames of test media 150. Generally, the center of test module 170 should be aligned to the center of test pattern 156 and each region 300 of test module 170 should be aligned with a corresponding region 200 of test pattern 156. In particular, region 300(0) of test module 170 should be aligned with region 200(0) of test pattern 156, region 300(1) of test module 170 should be aligned with region 200(1) of test pattern 156, region 300(2) of test module 170 should be aligned with region 200(2) of test pattern 156, region 300(3) of test module 170 should be aligned with region 200(3) of test pattern 156, region 300(4) of test module 170 should be aligned with region 200(4) of test pattern 156, and region 300(5) of test module 170 should be aligned with region 200(5) of test pattern 156. With each such region 300 aligned in this manner, the sensor 302 within any given region 300 may detect light intensity values associated with the corresponding region 200 of test pattern 156.

Because test module 170 and test pattern 156 are both radially symmetric polygons having similar shape, test pattern 156 need not be the same size as test module 170. In other words, when test module 170 is aligned in the manner discussed above, optical sensors 302 may accurately detect light intensity values associated with regions 200 of test pattern 156 for a range of sizes of test pattern 156. One advantage of this approach is that test module 170 is capable of detecting light intensity values of test patterns for a range of different screen sizes associated with display 160 and/or encoding parameters for test media 150.

Optical sensors 302 output values to MCU 310 that represent light intensity of the associated region 200 of test pattern 156. Optical sensors 302 may be analog sensors that output continuous values or digital sensors that output discrete values at periodic intervals. MCU 310 samples these values with a particular sampling frequency and then outputs sample data to MTE 118 via USB port 330. This sample data includes, for each optical sensor 302, a light intensity value and a timestamp. MCU 310 may also sample audio data associated with test media 150 via audio input 320 and output audio sample data (with corresponding timestamps) via USB port 330. MTE 118 processes this sample data in the manner described below in conjunction with FIG. 3B.

Figure 3B:
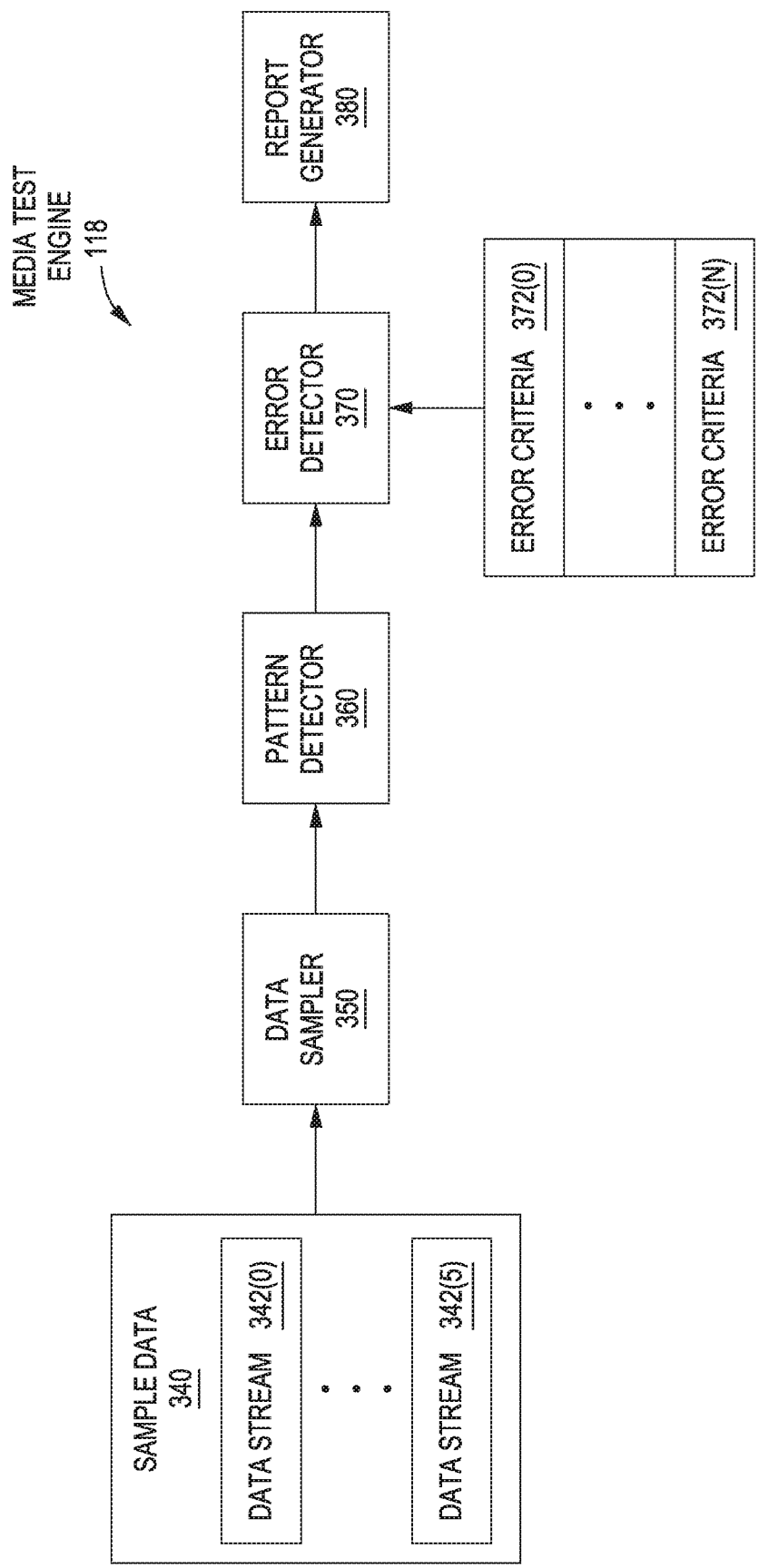
FIG. 3B is a more detailed illustration of the media test engine of FIG. 1, according to various embodiments of the present invention.

FIG. 3B is a more detailed illustration of the media test engine of FIG. 1, according to various embodiments of the present invention. As shown, MTE 118 includes a data sampler 350, a pattern detector 360, an error detector 370, and a report generator 380. Data sampler 350 is a software module configured to obtain sample data 340 from test module 170. As discussed above in conjunction with FIG. 3A, sample data 340 includes light intensity values and corresponding timestamps for each optical sensor 302(0) through 302(5) within test module 170, shown as data streams 342(0) through 342(5). To obtain sample data 340, data sampler 350 may poll USB port 330 periodically. Data sampler 350 transmits sample data 340 to pattern detector 360.

Pattern detector 360 is a software module configured to process the light intensity values included in sample data 340 to decode binary values associated with frames of test media 150. To decode the binary value for a given frame, pattern detector 360 analyzes the light intensity values of each data stream 342 across a frame interval. The frame interval generally represents a span of time when one frame of test media 150 is displayed on display 160. Pattern detector 360 selects a sample time that falls near the center of the frame interval. Then, pattern detector 360 determines whether the light intensity values of data streams 342(0) through 342(4) indicate that the corresponding region 200 of test pattern 156 is dark (a binary "0") or light (a binary "1") at the sample time. Pattern detector 360 computes the binary number corresponding to the frame and translates this binary number into an integer value. Pattern detector 360 timestamps the integer value with the sample time and transmits the timestamped value to error detector. This approach is described in greater detail below in conjunction with FIG. 4.

At the start of testing, pattern detector 360 performs an initialization procedure in order to size the frame interval appropriately. Pattern detector 360 first monitors data stream 342(5) to determine a refresh frequency associated with display 160 and a backlight intensity of display 160. Based on the refresh frequency, pattern detector 360 then samples data streams 342(0) through 342(4) at specific times when the backlight is active. Pattern detector determines when any of data streams 342(0) through 342(4) indicate that a region of test pattern 156 changes from light to dark or vice versa. Such a change indicates a frame boundary. By establishing a sequence of such frame boundaries, pattern detector estimates a frame rate with which endpoint device 130 plays test media 150, a frame duration associated with each frame of test media 150, and future frame boundaries corresponding to those frames.

Additionally, pattern detector 360 may calibrate an intensity threshold based on the determined intensity of the backlight. Pattern detector 360 may use this intensity threshold in order to determine whether a particular data stream 342 indicates dark (binary "0") or light (binary "1") at a given sample time. In one embodiment, pattern detector 360 operates in real time during playback of test media 150, and in other embodiments, pattern detector 360 operates offline on recorded data after playback of test media 150 is complete. This additional functionality of pattern detector 360 is also discussed in greater detail below in conjunction with FIG. 4.

Error detector 370 is configured to accumulate timestamped integer values from pattern detector 360 and then analyze sequences of those timestamped values to detect playback errors. Error detector 370 applies error criteria 370(0) through 372(N) to detect N distinct types of playback errors. For example, one error criteria 372 could specify that a "frame drop" error occurs if any timestamped integer value is missing from a sequence of timestamped integer values output by pattern detector 360. Another error criteria 372 could specify that a "freeze frame" error occurs if the difference between any two sequential timestamps exceeds a threshold value. Upon detecting an error, error detector 370 outputs error data to report generator 380. In one embodiment, error detector 370 operates in real time (with or without a marginal delay) during playback of test media 150, and in other embodiments, error detector 370 operates offline on recorded data after playback of test media 150 is complete. FIGS. 5A-5E discuss various playback errors in greater detail.

Report generator 380 is a software module configured to perform logging operations based on error data received from error detector 370. Error data associated with a detected error may include a description of the error, an indication of the relevant error criteria 372, one or more timestamped integer values associated with the error, one or more frame numbers where the error is detected, and other error-related data. Report generator 380 records this error data in human-readable form for later analysis.

Referring generally to FIGS. 2A-3B, MTE 118 and test module 170 interoperate in the manner described to automate testing of endpoint device 130 and, thus, reduce reliance on human test engineers. The testing procedure described may be implemented for a range of different versions of test media 150, including versions encoded with different encoding parameters. In addition, the disclosed testing procedure may be implemented with many different versions of endpoint application 148. Accordingly, an OEM of endpoint device 130 may perform comprehensive testing procedures that cover many more test cases than possible with conventional approaches. Further, those testing procedures may be more rigorous and have greater consistency across different display technologies and corresponding manufacturers.

Exemplary Test Pattern Sample Data

Figure 4:
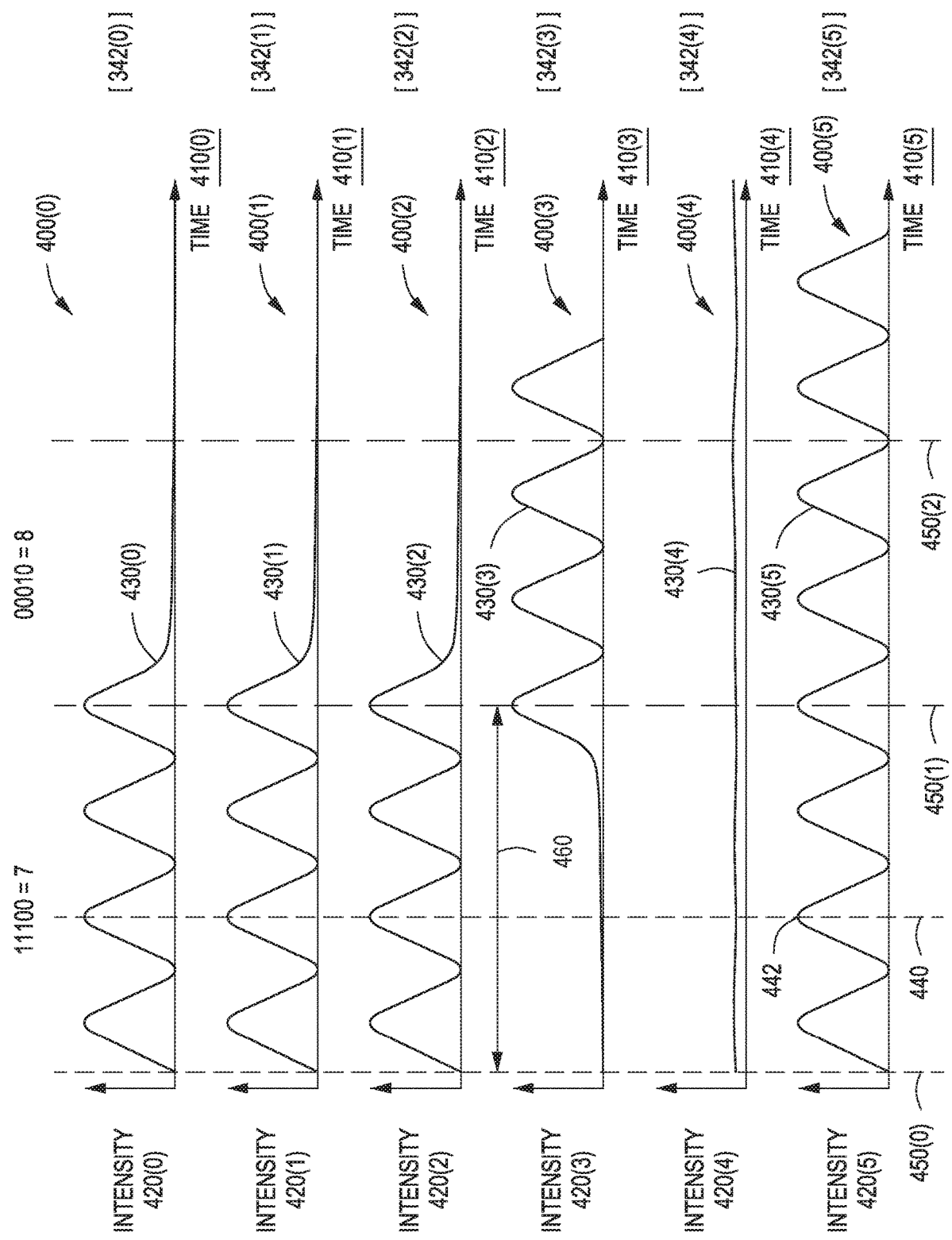
FIG. 4 illustrates exemplary test pattern intensity data gathered by the test module of FIG. 1, according to various embodiments of the present invention.

FIG. 4 illustrates exemplary test pattern intensity data gathered by the test module of FIG. 1, according to various embodiments of the present invention. Pattern detector 360 of FIG. 3B is configured to process data streams 342 to perform the analyses discussed herein.

As shown, each graph 400 includes a time axis 410, an intensity axis 420, and a plot 430 of intensity versus time. Each plot 430 represents a portion of a data stream 342 collected from a different optical sensor 302. Plot 430(0) represents a portion of data stream 342(0), plot 430(1) represents a portion of data stream 342(1), plot 430(2)

represents a portion of data stream 342(2), plot 430(3) represents a portion of data stream 342(3), plot 430(4) represents a portion of data stream 342(4), and plot 430(5) represents a portion of data stream 342(5). Each graph 400 includes a sample time 440 that corresponds to a peak 442 of plot 400(5). Graphs 400 also include frame boundaries 450(0) through 450(2). Frame boundaries 450(0) and 450(1) define a frame interval 460.

As discussed above in conjunction with FIG. 3B, pattern detector 360 is configured to process data streams 342 in order to decode a binary number for each frame of test media 150. To decode the binary number for a frame bounded by frame boundaries 450(0) and 450(1), pattern detector 360 samples all data streams 342 at time 440 and then determines whether each data stream indicates dark ("0") or light ("1"). In the example shown, pattern detector 360 determines that data streams 342(1) through 342(2) indicate light ("1"), while data streams 342(3) and 342(4) indicate dark ("0"). This particular sampling pattern corresponds to a binary number 11100 having integer value of 7. During a subsequent frame, pattern detector may perform a similar sampling procedure to decode a binary value of 00010 having integer value 8.

As also discussed above, pattern detector 360 may perform an initialization procedure in order to determine an appropriate size for frame interval 460. In doing so, pattern detector 360 initially processes data stream 342(5). Data stream 342(5) is derived from control region 200(5) of test pattern 156. Data stream 342(5) generally oscillates with the refresh frequency of display 160 between a minimum "dark" intensity value and a maximum "light" intensity value. Data streams 342(0) through 342(4) oscillate with this same refresh frequency when the corresponding region 200 of test pattern 156 is light, and bottom out to dark otherwise.

For example, plot 430(0) shows that optical sensor 302(0) detects light in region 200(0) between frame boundary 450(0) and frame boundary 450(1), and therefore plot 430(0) oscillates between the light value and the dark value within that timespan. Plot 430(0) also shows that optical sensor 302(0) detects dark in region 200(0) between frame boundary 450(1) and 450(2), and therefore plot 430(0) bottoms out to the dark value within that timespan.

Pattern detector 360 processes data stream 342(5) to determine the refresh frequency associated with display 160. In one embodiment, pattern detector 360 also determines the range of light values display 160 can produce, including the minimum dark value and maximum light values. Based on the refresh frequency, pattern detector 360 samples data streams 342(0) through 342(4) at specific sample times when the backlight of display 160 is active. Pattern detector 360 analyzes those samples to determine when the associated data streams 342 change between light and dark. Such changes indicate that the test pattern 156 superimposed onto the frame of test media 150 has changed between light and dark. This, in turn, indicates a frame boundary 450.

In one embodiment, pattern detector 360 may detect changes in test pattern 156 by identifying when one or more data streams 342 change between oscillating between the maximum light and minimum dark values and bottoming out to the minimum dark value. Again, oscillations between light and dark at the refresh frequency indicate that light is being displayed, whereas continuous dark indicates that dark is being displayed. Accordingly, pattern detector 160 may detect changes between light and dark in sample pattern 156 when data streams 342(0) through 342(4) shift between an oscillating state and a non-oscillating state. Based on these shifts, pattern detector 360 may detect a frame boundary 450.

Based on when frame boundaries 450 occur, pattern detector 360 establishes frame interval 460. Pattern detector 360 also determines a sample time towards the center of that window for sampling data streams 342(0) through 342(4). Based on these samples, pattern detector 360 decodes the associated binary number. Pattern detector 360 selects the sample time to occur at the closest peak of data stream 342(5) to the center of frame interval 460. This peak is shown as peak 442 in plot 430(5). In one embodiment, pattern detector 360 identifies peak 442 by identifying the portion of sample stream 342(5) with greatest magnitude within a threshold distance of the center of frame interval 460. The threshold distance may be determined based on the period of the refresh frequency.

Pattern detector 360 may perform the above initialization procedure in order to establish various timing parameters associated with the playback of test media 150, including frame rate, frame duration, and so forth. Then, pattern detector 360 outputs sequences of timestamped integer values to error detector 370 for error detection, as described in greater detail below in conjunction with FIGS. 5A-5E.

Exemplary Playback Error Detection

FIGS. 5A-5E illustrate how playback errors are detected based on sequences of timestamped values generated by the test module of FIG. 1, according to various embodiments of the present invention.

Figure 5A:
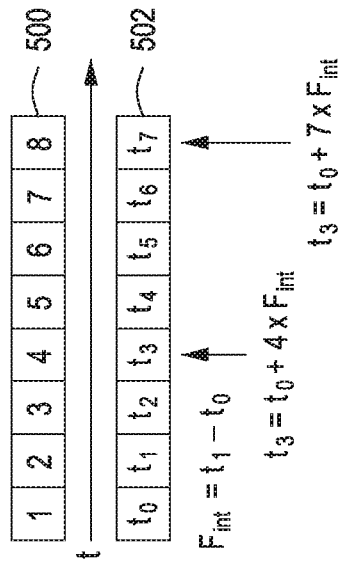
FIGS. 5A-5E illustrate how playback errors are detected based on sequences of timestamped values generated by the test module of FIG. 1, according to various embodiments of the present invention.

FIG. 5A illustrates a nominal sequence 500 of values and corresponding timestamps 502. Sequence 500 and timestamps 502 may be generated by pattern detector 360 and processed by error detector 370 of FIG. 3B. As shown, sequence 500 includes frame values 1 through 8 and timestamps 502 includes timestamps $t_0$ through $t_7$. Each timestamp 502 corresponds to a different frame value 500. Error detector 370 computes a frame interval $F_{int}$ by determining a difference or average of differences between adjacent timestamps. Based on $F_{int}$, error detector 370 computes a frames per second (FPS) value for test media 150. Alternatively, error detector 370 may determine an FPS value for test media 150 by interacting with endpoint device 130, and then determine $F_{int}$ based on that FPS value.

Based on $F_{int}$, error detector 370 computes various predicted timestamps. For example, error detector 370 may predict that $t_3$ will have a value of approximately $t_0+4*F_{int}$. Likewise, error detector 370 may predict that $t_7$ will have a value of approximately $t_0+7*F_{int}$. Generally, error detector may predict the timestamp for a given frame number N as $t_0+(N-1)*F_{int}$. Error detector 370 detects playback error occurs when predictions such as those discussed above are violated. Specific playback errors are discussed below in conjunction with FIGS. 5B-5E.

Figure 5B:
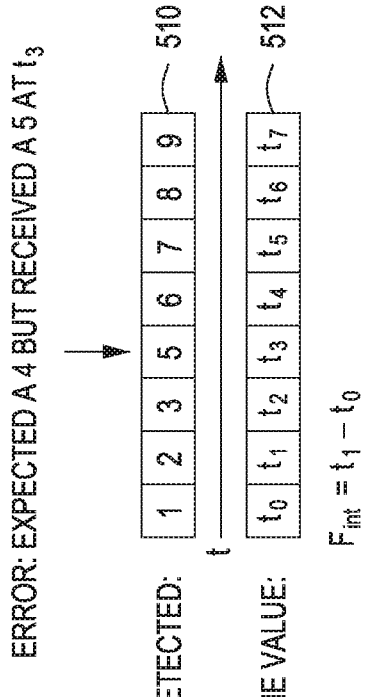

FIG. 5B illustrates a sequence 510 of values and corresponding timestamps 512 that may be associated with a "frame drop" error. Generally, each frame value 510 should be incrementally greater than a previous frame value (until the maximum frame value is reached and the subsequent frame value is zero). However, as is shown, at $t_3$ frame value 5 occurs instead of frame value 4. Error detector 370 may apply one or error criteria 372 to detect this frame drop error. Error detector 370 then transmits error data to report generator 380 indicating details of the detected error, as previously discussed.

Figure 5C:
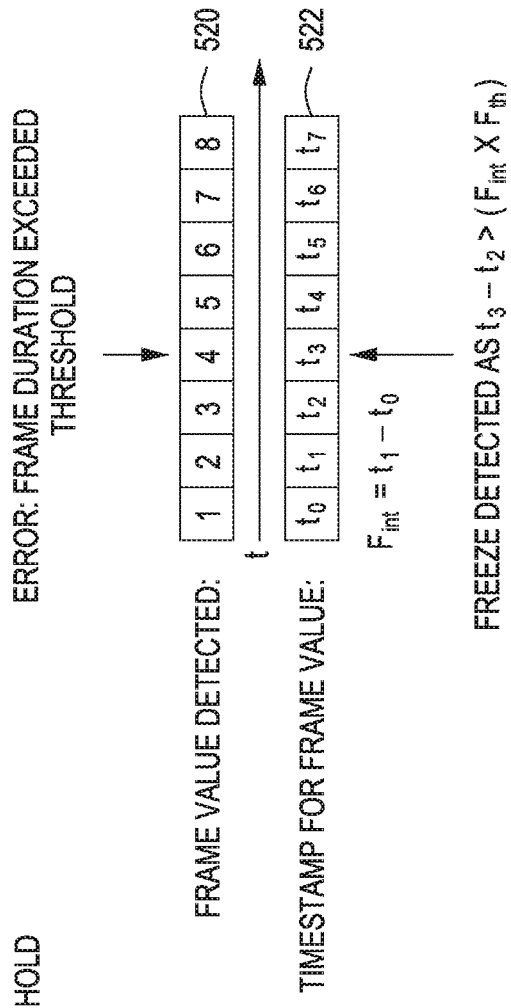

FIG. 5C illustrates a sequence 520 of values and corresponding timestamps 522 that may be associated with a "freeze frame" error. Generally, each timestamp 522 should be greater than the previous timestamp 522 by approximately $F_{int}$ and less than the subsequent timestamp 522 by approximately $F_{int}$. However, as is shown, the difference between $t_3$ and $t_2$ exceeds $F_{int}*F_{th}$, suggesting that a freeze frame has occurred. In other words, because $t_3-t_2$ is higher than expected, frame 3 was likely frozen at $t_3$. $F_{th}$ is a tolerance threshold that indicates how much greater than $F_{int}$ the difference between adjacent timestamps can be without triggering detection of a freeze frame. Error detector 370 may apply one or more error criteria 372 to detect the freeze frame error. Upon doing so, error detector 370 transmits error data to report generator 380 indicating details of the detected error.

Figure 5D:
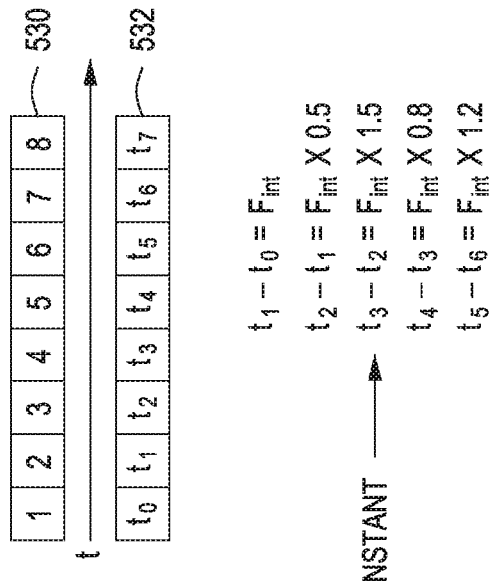

FIG. 5D illustrates a sequence 530 of values and corresponding timestamps 532 that may be associated with a "judder" or "stutter" error. Similar to the freeze frame error discussed above, under normal conditions, sequential timestamps 532 should increment by $F_{int}$. However, judder/stutter may occur if the increment between timestamps 532 is inconsistent. As shown, the difference between sequential timestamps varies between $F_{int}*0.5$ and $F_{int}*1.5$. Error detector 370 detects this variation and transmits associated error data to report generator 380.

Figure 5E:
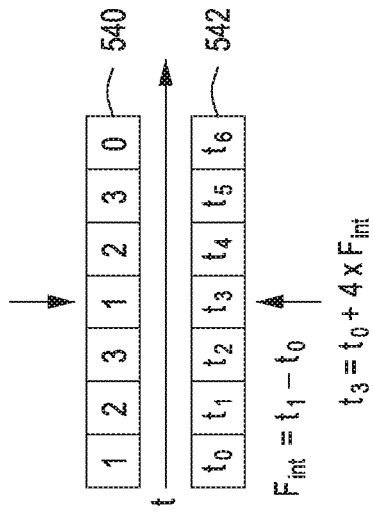

FIG. 5E illustrates a sequence 540 of values and corresponding timestamps 542 that may be associated with a "rollover" error. As previously discussed, the binary values associated with sequential test patterns 156 increment until a maximum value is reached and then "rollover" to zero and begin incrementing again. However, if a zero frame value does not follow the maximum frame value in sequence 540, error detector 370 may detect a rollover error. For example, in FIG. 5E, sequential test patterns 156 may implement a 2-bit counter that increments to 3 and then rolls over to 0. An error is detect because the first frame value of 3 is not followed by a frame value of 0. Typically, a rollover error is associated with a frame drop.

Referring generally to FIGS. 5A-5E, persons skilled in the art will understand that many different types of playback errors may be detected based on binary values encoded in test patterns. The various errors discussed herein are provided for exemplary purposes only. Error detector 370 of FIG. 3B may detect any technically feasible error based on any technically feasible error criteria 372. For example, in addition to the above, error detector 370 may identify a test procedure error when one or more optical sensors 302 detect dark for an extended period of time. The essential procedure implemented by MTE 118 and the various software modules included therein are discussed in greater detail below in conjunction with FIG. 6.

Procedure for Detecting Playback Errors

Figure 6:
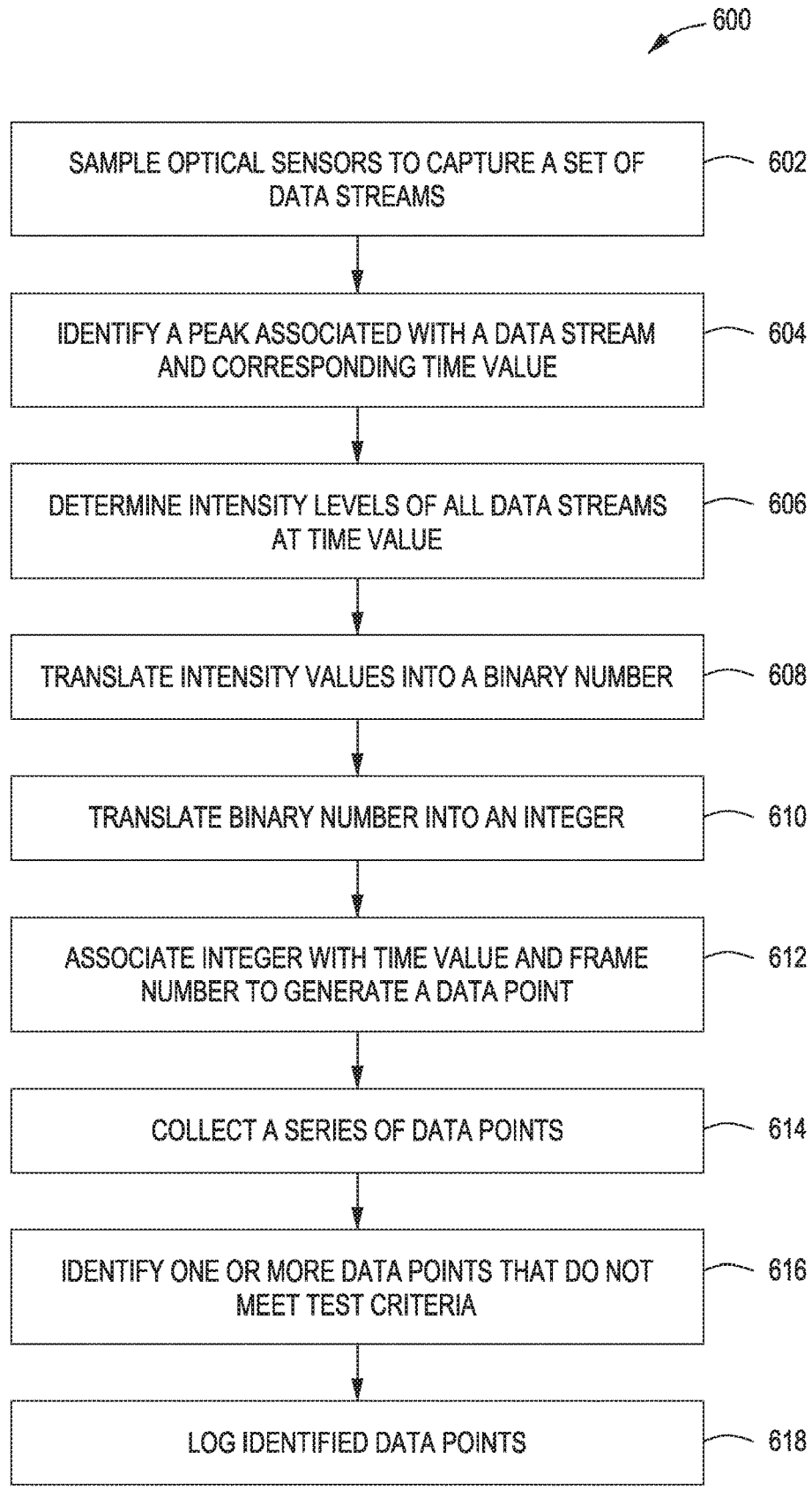
FIG. 6 is a flow diagram of method steps for detecting playback errors when streaming a media title to an endpoint device, according to various embodiments of the present invention.

FIG. 6 is a flow diagram of method steps for detecting playback errors when streaming a media title to an endpoint device, according to various embodiments of the present invention. Although the method steps are described in conjunction with the systems of FIGS. 1-5E, persons skilled in the art will understand that any system configured to perform the method steps, in any order, is within the scope of the present invention.

As shown, a method 600 begins at step 602, where MTE 118 samples optical sensors 302 of test module 170 to capture a set of data streams 342. Each data stream 342 may oscillate at the refresh frequency of display 160 between a "dark" value and a "light" value when the corresponding region 200 of test pattern 156 is light. Alternatively, each data stream 342 may bottom out to a value associated with "dark" when the corresponding region 200 of test pattern is dark"

At step 604, MTE 118 identifies a peak within a data stream 342 and a time value corresponding to that peak. For example, MTE 118 could identify peak 442 shown in FIG. 4. In practice, MTE 118 identifies the peak within data stream 342(5) associated with control region 200(5). MTE 118 generally identifies a peak closest to the center of a frame interval for a given frame.

At step 606, MTE 118 determines the light intensity value of data streams 342(0) through 342(4) at a timestamp associated with the peak. At step 608, MTE 118 translates the light intensity values into a binary number. In doing so, MTE 118 may rely on calibration data that indicates a light intensity threshold above which the data stream 342 indicates "light" and below which the data stream 342 indicates "dark." At step 610, MTE 118 translates the binary number into an integer value.

At step 612, MTE 118 associates the integer value with the timestamp and with a frame number to generate a data point. MTE 118 may determine the frame number based on interactions with endpoint device 130 and/or by processing test media 150 directly. Generally, each frame of test media 150 has a unique frame number, and MTE 118 may determine the frame number for a given frame based on a timestamp associated with the frame.

At step 614, MTE 118 collects a series of data points like those generated at step 612. MTE 118 could, for example, perform steps 602, 604, 606, 608, 610 and 612 of the method 600 repeatedly until collecting many such data points. At step 616, MTE 118 identifies one or more data points that do not meet test criteria 372. MTE 118 may perform the techniques described by way of example in conjunction with FIGS. 5A-5E to identify such data points. At step 618, MTE 118 logs the identified data points. In addition, MTE 118 may log error data associated with those data points in the manner described previously.

In one embodiment, the techniques described thus far may be expanded to detect errors with audio playback as well. In particular, a preprocessor engine could analyze an audio track associated with test media 150 and add a unique sound at regular intervals. The unique sound could be, for example, a click having a particular distinct frequency. The preprocessor engine would record the frame number of a video track included in test media 150 where the audio track includes the click. During testing, test module 170 (or a peripheral test module operating in conjunction with test module 170) would record audio from endpoint device 130 via audio input 320, and MTE 118 would then determine if the unique sound occurs during the proper frame. If the unique sound does not occur at the expected time, MTE 118 logs an audio playback error. MTE 118 could also detect audio silence, indicating an audio playback error. With this approach, MTE 118 may detect audio playback errors as well as video playback errors.

In sum, an endpoint device outputs frames of test media during a testing procedure. Each frame of test media includes a test pattern. A test module coupled to the endpoint device samples the test pattern and transmits sample data to a media test engine. The media test engine decodes a binary number from the test pattern and then converts the binary number to an integer value that is associated with the corresponding frame. The media test engine then analyzes sequences of these integer values to identify playback errors associated with the endpoint device.

At least one advantage of the techniques described herein is that automating testing of endpoint devices in the manner described greatly expands the test coverage feasible for OEMs of those endpoint devices. Accordingly, OEMs may uncover and remedy a greater number of playback errors before shipping endpoint devices to consumers. Further, the automated testing described herein is highly reproducible across different OEMs, greatly improving the consistency of test results between OEMs. Removing or limiting the involvement of human test engineers greatly increases the reliability of test procedure, further reducing the number of playback errors potentially exposed to end-users. Reducing human involvement also reduces cost, increases the speed of testing, and allows typically imperceptible errors to be detected without high-end computer hardware.

1. In some embodiments, a computer-implemented method comprises: sampling a test module coupled to a display of an endpoint device to generate a set of data streams, wherein the endpoint device outputs sequential frames of video data on the display, processing the set of data streams to generate a sequence of data points, wherein each data point in the sequence of data points corresponds to a different frame of the video data, determining that the sequence of data points has diverged from a predicted sequence of data points, and analyzing at least one divergence from the predicted sequence of data points to identify a first error associated with the sequential frames of video data output on the display.

2. The computer-implemented method of clause 1, wherein sampling the test module comprises obtaining separate sensor output from each sensor included in the test module, and wherein each sensor is coupled to a different region of the display.

3. The computer-implemented method of any of clauses 1 and 2, wherein each region of the display coupled to a given sensor displays a different portion of a test pattern for a specific frame of video data included in the sequential frames of video data, and wherein a pattern of at least one of one or more light portions and one or more dark portions of the test pattern encode a binary number associated with each frame of video data.

4. The computer-implemented method of any of clauses 1, 2, or 3, wherein processing the set of data streams to generate a data point included in the sequence of data points comprises: processing the set of data streams to generate a sample time, sampling a subset of data streams included in the set of data streams at the sample time to generate a plurality of intensity values, comparing the plurality of intensity values to an intensity threshold to generate a binary number corresponding to the sample time, decoding the binary number to produce an integer value, and timestamping the binary number based on the sample time.

5. The computer-implemented method of any of clauses 1, 2, 3, and 4, wherein processing the set of data streams to generate the sample time comprises: processing the set of data streams to identify a first frame boundary, identifying a first peak within a first data stream included in the set of data streams based on the first frame boundary, and determining the sample time based on a timestamp associated with the first peak.

6. The computer-implemented method of any of clauses 1, 2, 3, 4, and 5, wherein processing the set of data streams to identify the first frame boundary comprises: determining a maximum intensity value associated with the endpoint device based on the first data stream, determining a minimum intensity value associated with the endpoint device based on the first data stream, identifying a first time when a second data stream included in the set of data streams shifts from the maximum intensity value to the minimum intensity value, and defining the frame boundary at the first time.

7. The computer-implemented method of any of clauses 1, 2, 3, 4, 5, and 6, wherein processing the set of data streams to identify the first frame boundary comprises: determining a maximum intensity value associated with the endpoint device based on the first data stream, determining a minimum intensity value associated with the endpoint device based on the first data stream, determining a refresh frequency associated with the endpoint device based on the first data stream, identifying a first span of time when a second data stream included in the set of data streams oscillates between the maximum intensity value and the minimum intensity value at the refresh frequency, identifying a second span of time when the second stream remains at the minimum intensity value, and defining the frame boundary at a juncture between the first span of time and the second span of time.

8. The computer-implemented method of any of clauses 1, 2, 3, 4, 5, 6, and 7, wherein identifying the first peak in the first data stream comprises: identifying a first frame time associated with a first frame included in the sequential frames of video data, wherein the first frame is bounded by the first frame boundary, and identifying a maximum value of the first data stream within a threshold time of the first frame time.

9. The computer-implemented method of any of clauses 1, 2, 3, 4, 5, 6, 7, and 8, wherein determining that the sequence of data points diverges from the predicted sequence of data points comprises: identifying a first integer value included in a first data point in the sequence of data points, identifying a second integer value included in a second data point in the sequence of data points, determining, based on the predicted sequence of data points, that the second integer value should be greater than the first integer value by a value of one, and determining that the second integer value is not greater than the first integer value by a value of one.

10. The computer-implemented method of any of clauses 1, 2, 3, 4, 5, 6, 7, 8, and 9, wherein determining that the sequence of data points has diverged from the predicted sequence of data points comprises: identifying a first timestamp associated with a first data point included in the sequence of data points, identifying a second timestamp associated with a second data point in the sequence of data points, determining, based on the predicted sequence of data points, that the second timestamp should be greater than the first timestamp by a frame interval value, and determining that the second timestamp is not greater than the second timestamp by the frame interval value.

11. In some embodiments, a non-transitory computer-readable medium includes instructions that, when executed by a processor, cause the processor to perform the steps of: sampling a test module coupled to a display of an endpoint device to generate a set of data streams, wherein the endpoint device outputs sequential frames of video data on the display, processing the set of data streams to generate a sequence of data points, wherein each data point in the sequence of data points corresponds to a different frame of the video data, determining that the sequence of data points has diverged from a predicted sequence of data points, and analyzing at least one divergence from the predicted sequence of data points to identify a first error associated with the sequential frames of video data output on the display.

12. The non-transitory computer-readable medium of clause 11, wherein the step of processing the set of data streams to generate a data point included in the sequence of data points comprises: processing the set of data streams to generate a sample time, sampling a subset of data streams included in the set of data streams at the sample time to generate a plurality of intensity values, comparing the plurality of intensity values to an intensity threshold to generate a binary number corresponding to the sample time, decoding the binary number to produce an integer value, and time-stamping the binary number based on the sample time.

13. The non-transitory computer-readable medium of any of clauses 11 and 12, wherein the step of determining that the sequence of data points has diverged from the predicted sequence of data points comprises: identifying a first integer value included in a first data point in the sequence of data points, identifying a second integer value included in a second data point in the sequence of data points, determining, based on the predicted sequence of data points, that the second integer value should be greater than the first integer value by a value of one, and determining that the second integer value is not greater than the first integer value by a value of one.

14. The non-transitory computer-readable medium of any of clauses 11, 12, and 13, wherein the step of determining that the sequence of data points has diverged from the predicted sequence of data points comprises: identifying a first timestamp associated with a first data point included in the sequence of data points, identifying a second timestamp associated with a second data point in the sequence of data points, determining, based on the predicted sequence of data points, that the second timestamp should be greater than the first timestamp by a frame interval value, and determining that the second timestamp is not greater than the second timestamp by the frame interval value.

15. The non-transitory computer-readable medium of any of clauses 11, 12, 13, and 14, wherein the step of determining that the sequence of data points has diverged from the predicted sequence of data points comprises: identifying a first timestamp associated with a first data point included in the sequence of data points, identifying a second timestamp associated with a second data point included in the sequence of data points, identifying a third timestamp associated with a third data point in the sequence of data points, comparing the first timestamp to the second timestamp to generate a first frame interval, comparing the second timestamp to the third timestamp to generate a second frame interval, computing a difference value between the first frame interval and the second frame interval, determining, based on the predicted sequence of data points, that the difference value should not exceed a threshold value, and determining that the difference value exceeds the threshold value.

16. The non-transitory computer-readable medium of any of clauses 11, 12, 13, 14, and 15, wherein the step of determining that the sequence of data points has diverged from the predicted sequence of data points comprises: identifying a first integer value associated with a first data point included in the sequence of data points, identifying a second integer value associated with a second data point included in the sequence of data points, determining, based on the predicted sequence of data points, that the second integer value should be zero, and determining that the second integer value is not zero.

17. The non-transitory computer-readable medium of any of clauses 11, 12, 13, 14, 15, and 16, further comprising determining that the sequence of data points has diverged from the predicted sequence of data points to identify a second error associated with the sequential frames of video data output on the display, wherein the audio data corresponds to the video data.

18. The non-transitory computer-readable medium of any of clauses 11, 12, 13, 14, 15, 16, and 17, wherein the step of determining that the sequence of data points has diverged from the predicted sequence of data points comprises: identifying a first timestamp associated with a first data point in the sequence of data points, determining, based on the predicted sequence of data points, that an audio sample should be present in the audio data at the first timestamp, and determining that no audio sample is present in the audio data at the first timestamp.

19. In some embodiments, a system, comprises: a test module that is coupled to a display of an endpoint device and detects light intensity associated with a first sample pattern displayed on the display, a memory storing a software application, and a processor that, when executing the software application, performs the steps of sampling the test module to generate a set of data streams, wherein the endpoint device outputs sequential frames of video data on the display, processing the set of data streams to generate a sequence of data points, wherein each data point in the sequence of data points corresponds to a different frame of the video data, determining that the sequence of data points has diverged from a predicted sequence of data points, and analyzing at least one divergence from the predicted sequence of data points to identify a first error associated with the sequential frames of video data output on the display.

20. The system of clause 19, wherein the test module comprises a first radially symmetric polygon having a first shape and the first sample pattern comprises a second radially symmetric polygon having the first shape.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method, comprising:
   sampling a test module coupled to a display of an endpoint device to generate a set of data streams;
   processing the set of data streams to generate a sequence of data points;
   determining that the sequence of data points has diverged from a predicted sequence of data points; and
   analyzing at least one divergence from the predicted sequence of data points to identify a first error associated with a plurality of frames of video data output for display.

2. The computer-implemented method of claim 1, wherein sampling the test module comprises obtaining sensor output from each sensor included in the test module, and wherein each sensor is coupled to a different region of the display.

3. The computer-implemented method of claim 2, wherein each region of the display coupled to a given sensor displays a different portion of a test pattern for a specific frame of video data included in the plurality of frames of video data.

4. The computer-implemented method of claim 1, wherein processing the set of data streams to generate the sequence of data points comprises:
   sampling a subset of data streams included in the set of data streams at a sample time to generate a plurality of intensity values;
   comparing the plurality of intensity values to an intensity threshold to generate a binary number corresponding to the sample time; and
   timestamping the binary number based on the sample time.

5. The computer-implemented method of claim 1, wherein processing the set of data streams to generate the sequence of data points comprises:
   performing one or more operations on the set of data streams to identify a first frame boundary;
   identifying a first peak within a first data stream included in the set of data streams based on the first frame boundary;
   determining a sample time based on a timestamp associated with the first peak.

6. The computer-implemented method of claim 5, wherein the first peak is associated with a maximum value of the first data stream that occurs within a threshold time of a first frame that is included in the plurality of frames and bounded by the first frame boundary.

7. The computer-implemented method of claim 1, wherein processing the set of data streams to generate the sequence of data points comprises:
   determining a maximum intensity value associated with the endpoint device based on a first data stream included in the set of data streams;
   determining a minimum intensity value associated with the endpoint device based on the first data stream; and
   identifying a first time when a second data stream included in the set of data streams shifts from the maximum intensity value to the minimum intensity value; and
   defining a frame boundary at the first time.

8. The computer-implemented method of claim 1, wherein processing the set of data streams to generate the sequence of data points comprises:
   determining a maximum intensity value associated with the endpoint device based on a first data stream included in the set of data streams;
   determining a minimum intensity value associated with the endpoint device based on the first data stream;
   determining a refresh frequency associated with the endpoint device based on the first data stream;
   identifying a first span of time based on the refresh frequency;
   identifying a second span of time when the second stream remains at the minimum intensity value; and
   defining a frame boundary based on the first span of time and the second span of time.

9. The computer-implemented method of claim 1, wherein determining that the sequence of data points diverges from a predicted sequence of data points comprises:
identifying a first integer value included in a first data point in the sequence of data points;
identifying a second integer value included in a second data point in the sequence of data points; and
determining that the second integer value is not greater than the first integer value.

10. The computer-implemented method of claim 1, wherein determining that the sequence of data points has diverged from the predicted sequence of data points comprises:
identifying a first timestamp associated with a first data point included in the sequence of data points;
identifying a second timestamp associated with a second data point in the sequence of data points; and
determining that the second timestamp is not greater than the second timestamp.

11. A non-transitory computer-readable medium including instructions that, when executed by a processor, cause the processor to perform the steps of:
sampling a test module to generate a set of data streams;
processing the set of data streams to generate a sequence of data points; and
identifying one or more data points that do not meet one or more test criteria.

12. The non-transitory computer-readable medium of claim 11, wherein identifying the one or more data points comprises determining that the sequence of data points has diverged from a predicted sequence of data points.

13. The non-transitory computer-readable medium of claim 12, wherein identifying the one or more data points further comprises analyzing at least one divergence from the predicted sequence of data points to identify a first error associated with a plurality of frames of video data output on a display.

14. The non-transitory computer-readable medium of claim 12, wherein determining that the sequence of data points has diverged from a predicted sequence of data points comprises:
identifying a first integer value associated with a first data point included in the sequence of data points;
determining that the first integer value should be zero; and
determining that the first integer value is not zero.

15. The non-transitory computer-readable medium of claim 12, wherein determining that the sequence of data points has diverged from the predicted sequence of data points comprises:
identifying a first timestamp associated with a first data point in the sequence of data points;
determining that an audio sample should be present in the audio data at the first timestamp; and
determining that no audio sample is present in the audio data at the first timestamp.

16. The non-transitory computer-readable medium of claim 11, wherein the test module is coupled to a display of an endpoint device, the endpoint device outputs a plurality of frames of video data on the display, and each data point in the sequence of data points corresponds to a different frame of the video data.

17. The non-transitory computer-readable medium of claim 11, wherein processing the set of data streams comprises:
performing one or more operations on the set of data streams to generate a sample time; and
sampling a subset of data streams included in the set of data streams at the sample time to generate a plurality of intensity values.

18. The non-transitory computer-readable medium of claim 11, wherein processing the set of data streams further comprises:
comparing the plurality of intensity values to an intensity threshold to generate a binary number corresponding to the sample time;
decoding the binary number to produce an integer value; and
timestamping the binary number based on the sample time.

19. The non-transitory computer-readable medium of claim 11, wherein the test module is coupled to a display of an endpoint device.

20. A system, comprising:
a test module that detects a first sample pattern displayed on a display; and
a processor that, when executing a set of instructions, performs the steps of:
sampling the test module to generate a set of data streams;
processing the set of data streams to generate a sequence of data points; and
determining that the sequence of data points has diverged from a predicted sequence of data points.

21. The system of claim 20, wherein the test module comprises a radially symmetric polygon.

22. The system of claim 21, wherein the first sample pattern is reflective of the radially symmetric polygon.

23. The system of claim 20, wherein the display comprises a display of an endpoint device, and the test module is coupled to the display of the endpoint device.

24. The system of claim 20, wherein the processor further performs the step of analyzing at least one divergence from the predicted sequence of data points to identify a first error associated with a plurality of video frames.

* * * * *